United States Patent

[11] 3,594,498

[72] Inventor Peter W. Smith
Beaconsfield, Quebec, Canada
[21] Appl. No. 865,155
[22] Filed Oct. 9, 1969
[45] Patented July 20, 1971
[73] Assignee Central Dynamics, Ltd.
Pointe Claire, Montreal, Quebec, Canada

[54] COLOR-PHASE-CORRECTING CIRCUITRY WITH ONE-HUNDRED EIGHTY DEGREE AMBIGUITY ELIMINATION
5 Claims, 4 Drawing Figs.

[52] U.S. Cl. 178/5.4 CD, 178/6.6 TC, 178/69.5 CB
[51] Int. Cl. H04n 5/24, H04n 5/78, H04n 9/46
[50] Field of Search 178/6.6 A, 6.6 P, 5.4 CD, 5.4 SY, 69.5 CB, 6.6 TC

[56] References Cited
UNITED STATES PATENTS

| | | | |
|---|---|---|---|
| 3,461,226 | 8/1969 | Carnt | 178/5.4 CD |
| 3,474,190 | 10/1969 | Bruch | 178/5.4 CD |

*Primary Examiner*—Bernard Konick
*Assistant Examiner*—Howard W. Britton
*Attorney*—Addams & Ferguson ABSTRACT: Color-phase-correcting circuitry for use with a color video tape machine is disclosed. Such machines typically include (1) a tape drive, (2) means for controlling the speed of the tape which are responsive to the vertical synchronizing pulses derived from a video reference signal (3) a read/write head for reading a signal from the tape to thereby derive a composite color signal, (4) means for adjusting the phase of the composite signal so that the horizontal and vertical synchronizing pulses of the composite signal are in phase with the horizontal and vertical pulses of the video reference signal, and (5) means for adjusting the phase of the composite signal so that the color subcarrier of the composite signal will be in phase with the color subcarrier of the reference signal. This adjustment is made following the adjustment described in (4) and under some circumstances can cause the phase adjustment described in (4) to be destroyed. The improvement includes a sync signal comparator which compares the phase of the horizontal synchronizing pulses of the composite color signal with the phase of the horizontal synchronizing pulses of the video reference signal after the correction described in (5) has taken place. If any phase deviation exists, an appropriate signal is applied to circuitry which controls the tape speed to shift the video signal one picture frame. Phase synchronism is then obtained with respect to both the vertical and horizontal synchronizing pulses and with respect to the color subcarrier signals.

INVENTOR
PETER W. SMITH

BY Addams & Ferguson
ATTORNEYS

PATENTED JUL 20 1971

3,594,498

SHEET 2 OF 2

INVENTOR
PETER W. SMITH

BY Addams & Ferguson
ATTORNEYS

COLOR-PHASE-CORRECTING CIRCUITRY WITH ONE-HUNDRED EIGHTY DEGREE AMBIGUITY ELIMINATION

BACKGROUND OF THE INVENTION

This invention relates to color-phase-correcting circuitry for use with video tape recorders and in particular to such circuitry for insuring phase synchronization between both the synchronizing pulses and the color subcarrier of the composite color signal produced by a tape-recording machine with respect to the synchronizing pulses and color subcarrier of the video reference signal.

As will be described in more detail hereinafter, prior art video tape-recording systems for monochrome television signals are known which enable one to phase synchronize the composite monochrome signal to a video reference signal. Further, means are known for synchronizing the color subcarrier of a signal stored on a video tape recorder with the color subcarrier of the video reference signal. However, such prior art means contain an inherent 180° phase ambiguity in that, in the NTSC color system, the color subcarrier phase with respect to the synchronizing phase is not identical in each frame as will be described in more detail hereinafter.

To perform a good edit on video tape, it is therefore not sufficient to edit from any frame to any other frame, as the above mentioned 180° phase change may occur. Thus, there are two ways in which a tape machine may lock onto the reference synchronizing pulses and only one of these will result in the color subcarrier on the tape being in phase with the reference subcarrier.

SUMMARY OF THE INVENTION

Thus, it is a primary object of this invention to provide circuitry for insuring that the color subcarrier and synchronizing pulses of the composite color signal from a video tape-recording machine are in phase synchronism with both the color subcarrier and synchronizing pulses of a locally generated video reference signal.

It is a further object of this invention to provide such circuitry wherein the speed of the tape will be momentarily increased so as to shift by one frame the composite color signal from the tape with respect to the reference synchronizing pulse.

Other objects and advantages of this invention will become apparent upon reading the appended claims in conjunction with the following detailed description and the attached drawing.

DETAILED DESCRIPTION OF A PREFERRED EMBODIMENT OF THE INVENTION

Figure 1:
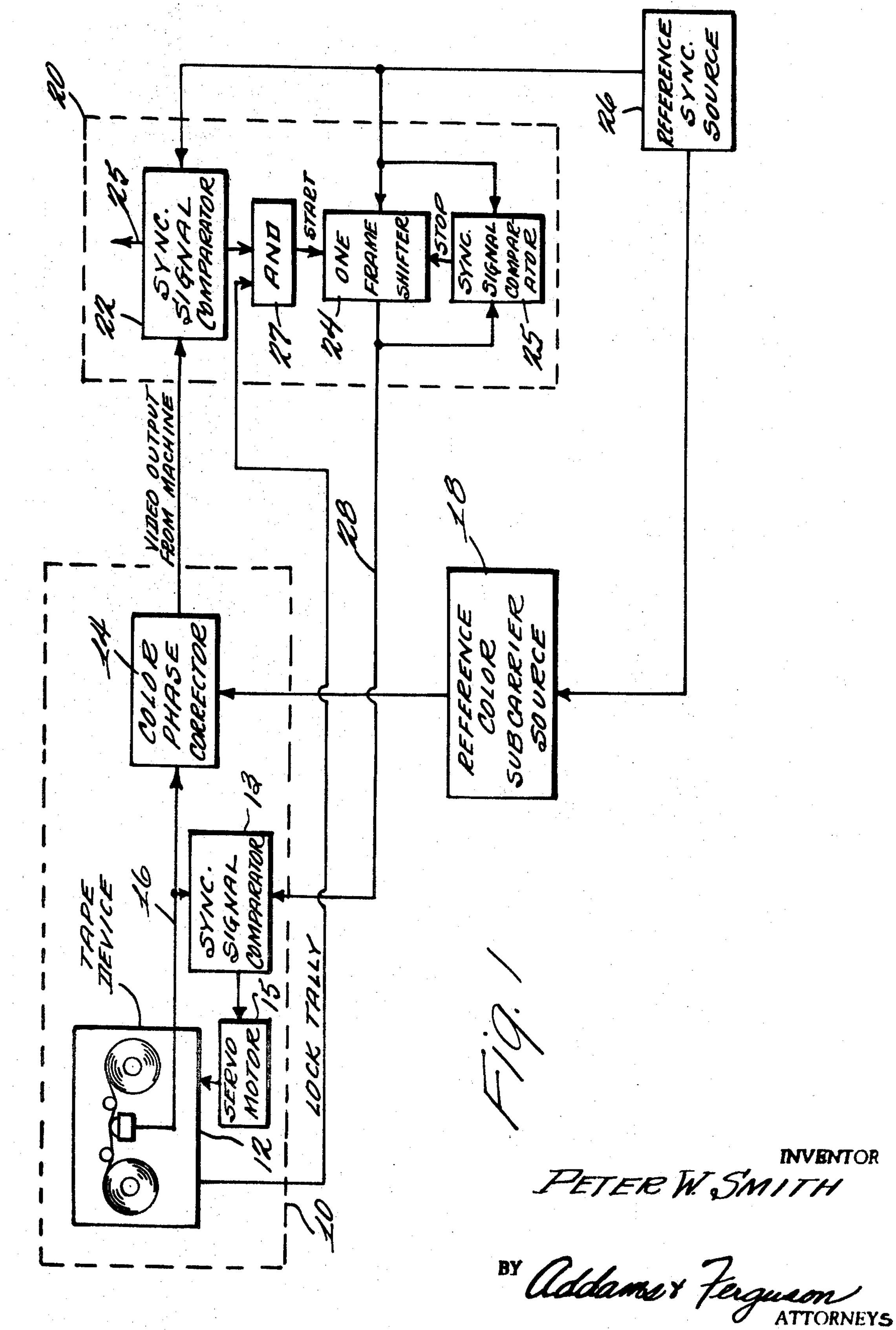
FIG. 1 is a block diagram of an illustrative embodiment of the invention.

Referring to FIG. 1, there is shown a block diagram of an illustrative embodiment of the invention. A tape machine is indicated at 10 and includes a tape drive 12, a sync signal comparator 13, a color subcarrier phase corrector 14, and a servomotor 15. The machine 10 corresponds to tape-recording machines typically used in color television recording and as such is well known to those of ordinary skill in this art. Tape drive 12 includes typically a four-channel tape for respectively storing audio, video, cue, and control information as used in video tape-recording systems. Further, tape drive 12 typically includes four read/write heads respectively associated with these channels. Of particular interest with respect to this invention is the video channel, the composite video output signal from the tape device 12 being applied to line 16 and thence to color phase corrector 14 and sync signal comparator 13, which includes conventional circuitry for phase comparing the pulses of the composite signal from the tape with reference pulses applied from source 26. Any phase deviation will result in an appropriate control signal being applied to servomotor 15 to regulate the speed of tape device 12 in a well known manner until the pulses of the composite signal are brought into phase synchronism with the reference pulses from source 26.

Color subcarrier corrector 14 includes conventional phase-shifting circuitry for varying or controlling the entire phase of the composite video output signal from tape device 12 in accordance with the phase of the reference color subcarrier signal applied from source 18. That is, the phase of the entire composite signal is shifted until the color subcarrier thereof is synchronized with the reference color subcarrier. The phase-adjusted output signal from color subcarrier corrector 14 is applied to color phase corrector 20, which includes a sync signal comparator 22, a frame shifter or control signal generator 24, a sync signal comparator 25, and AND circuit 27.

Phase corrector 20 constitutes the improvement of this invention. Applied to synchronizing signal comparator 22 and frame shifter 24 is a reference-synchronizing signal from source 26. The sync signal source typically applies both horizontal and vertical synchronizing reference pulses to frame shifter 24. These pulses are then applied over line 28 to tape drive 12 to control the speed of the tape. These pulses may be broadly termed as a control signal for controlling the speed of the tape. Thus, the higher the frequency of the pulses on line 28, the faster the tape moves, as will be explained in more detail hereinafter. The horizontal and vertical pulses are also applied to sync comparator 22; however, only the horizontal pulses are used. Further, the horizontal and vertical reference pulses are also applied to color subcarrier source 18 for synchronization purposes.

Figure 2A:
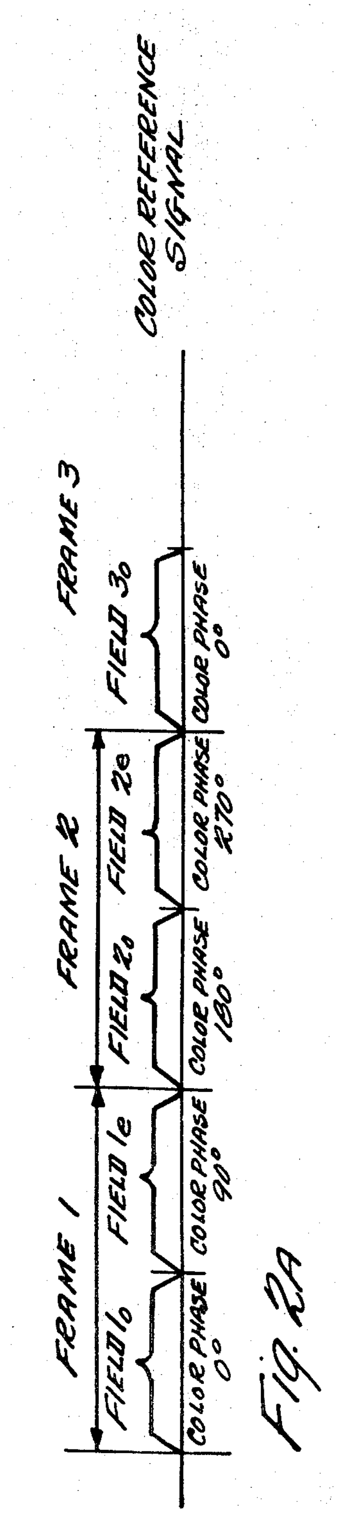
FIGS. 2A—2C illustrate the phasing problems met and solved by the invention.
Figure 2B:
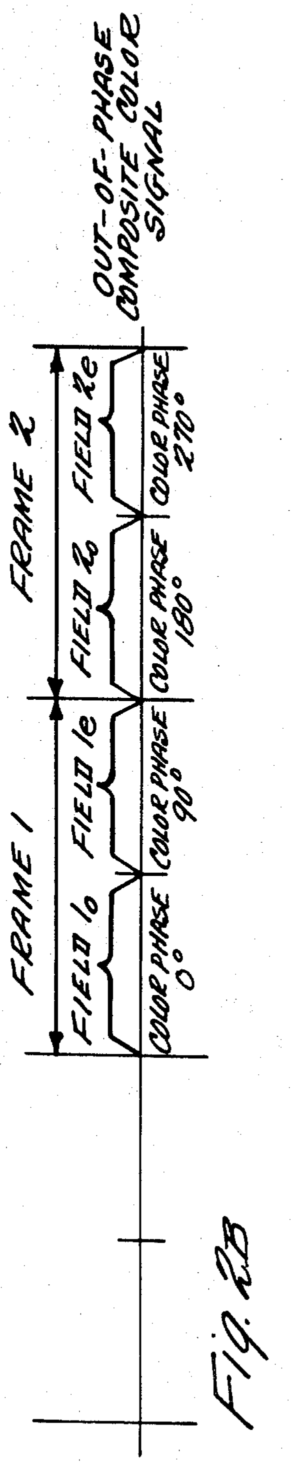
Figure 2C:
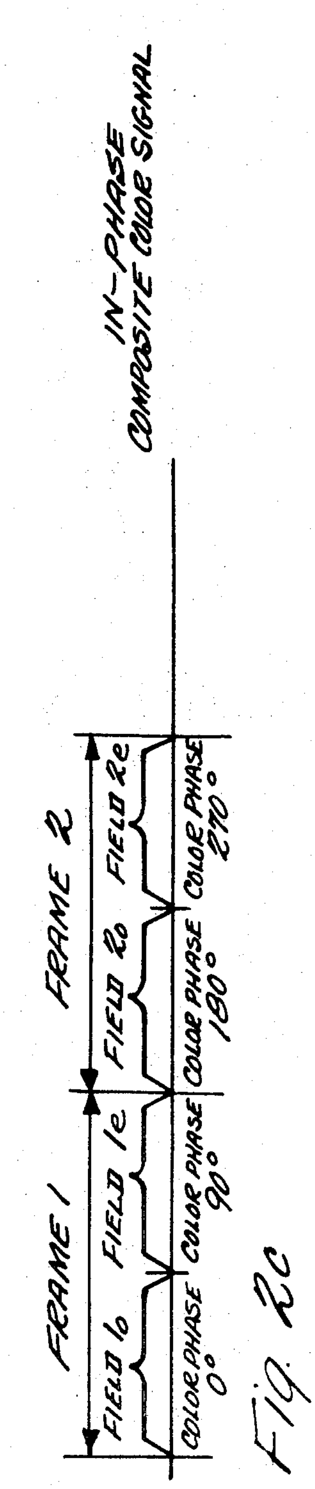

Before describing the operation of the circuitry of FIG. 1, reference should be made to FIGS. 2A—2C for a better understanding of the problem addressed by this invention. In the prior art monochrome systems for obtaining synchronization between a composite monochrome video signal and a reference signal, all that was necessary to insure synchronization was to obtain synchronization between the horizontal and vertical synchronizing pulses of the composite signal and the reference signal. In other words, as long as the horizontal and vertical synchronizing pulses of any frame of the composite signal were in synchronism with the horizontal and vertical synchronizing pulses of any frame of the reference signal, synchronization had been obtained between the two signals. Such means for obtaining the synchronization for a composite monochrome video signal are well known to those of ordinary skill in this art.

However, in order to obtain synchronization between a composite color video signal and a reference signal which includes a color subcarrier signal and vertical and horizontal synchronizing pulses, it is not possible to use the above discussed technique employed for the synchronization of a monochrome signal with respect to a monochrome reference signal. This is because in the NTSC color system, the color subcarrier phase is not identical with respect to the synchronizing pulse for each frame. This is diagrammatically illustrated on a relative scale in FIG. 2A although FIGS. 2B and 2C could also be employed to illustrate this point. FIG. 2A illustrates the color video reference signal which is generated by source 18, this signal, of course, being comprised of a large number of sequentially occurring frames. However, for purposes of illustration only two successive frames, 1 and 2, respectively, are shown. Note in the first or odd field $1_o$ of frame 1, the relative phase of the color subcarrier with respect to the synchronizing signal is 0°. In the even field of this frame, the relative phase increases to 90°. Further, as can be seen in frame 2, the relative phase of the odd and even fields thereof increases to 180° and 270° respectively. Further, it can be seen that in the odd field of frame 3, the relative phase of the color subcarrier with respect to the synchronizing pulses has returned to 0°.

Reference should now be made to FIGS. 2A and 2B which illustrate why one cannot obtain full synchronization between a composite color video signal and a color video reference signal if only the horizontal and vertical pulses of any frame of the color reference signal are synchronized with respect to the same pulses of any frame of the composite color signal. FIG. 2B illustrates such a composite color signal where the synchronizing pulses of frame 2 of the color reference signal of FIG. 2A have been synchronized with the synchronizing pulses of frame 1 of the color signal of FIG. 2B. This is all that would be necessary to insure synchronization of a composite monochrome signal with a monochrome reference signal, as stated hereinbefore. However, as can be seen the phase of the color subcarrier of the composite color signal is not the same as the phase of the color subcarrier of the color reference signal. In fact, they are 180° out of phase as can be seen.

Thus, in order to insure complete synchronization between a composite color signal and a color reference signal, the synchronization must be such that the relation between the signals of FIGS. 2A and 2C is obtained. As can be seen not only is synchronization obtained between all horizontal and vertical synchronizing pulses but also synchronization is obtained between the color subcarriers of the composite color signal and the reference subcarrier. Further, it can be seen that in order to completely synchronize the signal of FIG. 2A with respect to the signal of FIG. 2B, one of these signals must be shifted one frame with respect to the other one. As will now be brought out, in this invention the composite signal is shifted one frame with respect to the reference signal.

The operation of the circuitry of FIG. 1 will now be described. Assume at this time that phase lock has yet to be established between the synchronizing pulses of the composite signal and those of the reference signal. The composite signal from tape drive 12 is applied to sync signal comparator 13 where the phase of the synchronizing pulses thereof are compared with the phase of the synchronizing pulses of the color reference signal. Any phase deviation between these synchronizing pulses will result in a control signal being applied to servomotor 15 to control the speed of the tape drive 12. The servomotor 15 is responsive to any phase difference between the tape vertical synchronizing pulses and the vertical synchronizing pulses of the color reference signal. If any difference occurs, the motor speed is varied until the difference is reduced to zero, such servo loop control of tape drives under the control of a video reference signal being well known.

As stated hereinbefore, it may be that after synchronism has been obtained at comparator 13 between the synchronizing pulses of the composite signal and the reference signal, the situation illustrated in FIGS. 2A and 2B will have resulted. If such is the case, the phase difference of the color subcarriers of the composite and reference signals will be 180°. This, of course, is detected by corrector 14 thereby shifting the entire composite signal by one-half the color subcarrier period to thereby destroy the correction made at comparator 13. The color subcarriers will of course now be in phase. However, since the entire composite signal is shifted, the phase of the horizontal synchronizing pulses of the composite signal are shifted one-half the color subcarrier period with respect to the horizontal synchronizing signals of the color reference signal. This is detected at comparator 22 and the correction signal is applied to AND circuit 27. Also applied to AND circuit 27 is a "lock" tally which is generated at the time the tape drive 12 obtains its initial lock to the reference pulses fed to it. The AND circuit 27 will thus cause a "start" signal to be applied to frame shifter 24, which shifts the phase of the composite signal by exactly one frame. That is, the frame shifter increases the repetition rate of the field pulses by subtracting typically eight horizontal (line) pulses from each field. The field pulses then occur every 254 one-half lines (rather than the normal 262 one-half lines), or slightly faster than normal. Such means for subtracting line pulses from a reference pulse train to increase the effective field pulse repetition rate are well known to those of ordinary skill in this art. With the increase in field pulse frequency, the frame shifter will lose synchronism with the reference pulses.

If the two pulse trains are compared, the field pulses generated by the shifter will be seen to move slowly ahead of the reference field pulses, as the frame shifter is generating its field pulses at a faster rate than the reference pulses.

After a short time, typically a little over 1 second, the frame shifter's field pulses will have moved so far ahead that they are once again in phase with the reference field pulses. This state will be indicated by the sync comparator 25. As this sync comparator is able to detect frame pulses as opposed to field pulses, it will indicate synchronism after a one frame (or two field) shift has occurred between the pulses supplied by the frame shifter and the reference pulses. A "stop" command is then given to the frame shifter.

The comparator 13 of tape machine 10 is fed with the pulses from the frame shifter, and will therefore receive the pulse train containing the one frame shift. The tape machine will follow this one frame shift quite closely, although it loses its normal replay state of a very tight lock to the pulses fed into it. It is unable to remain tightly locked to "nonstandard" pulses provided by the frame shifter. When a normal pulse feed is resumed, however, the machine quickly regains its tightly locked condition, locking to the nearest pulse train quite closely. The pulse to which it locks is invariably the right one. In other words, when the frame shifter supplies the "shifting" pulse train, the tape machine follows it closely, although it loses its tightly locked condition. When pulse train has completed a one frame shift with respect to reference, normal pulse feed is resumed, and the tightly locked condition is regained.

After a "start" command is given to frame shifter 24, the end of the one frame shift in the pulses supplied to the tape machine is detected by the sync comparator 25 which detects coincidence reoccurring between the input reference field pulses and the output field pulses from the frame shifter. Further, after the "start" command is given, the output of comparator 22 is disabled by means not shown. It can only be enabled again after the machine 10 has been stopped, so that it is ready to make another phase correction, if necessary, the next time the machine is started up.

After the above described frame shift takes place, the situation of FIGS. 2A and 2C results and, as can be seen, the desired synchronization is attained. The frame shifter 24 typically increases the pulse frequency as described above. Of course, if upon the initial phase lock between the horizontal synchronizing pulses of the composite and reference signals, the relation between the signals of FIGS. 2A and 2C is immediately obtained, and the frame shifter 24 would not shift the reference signal one frame as described above. However, the probability of this occurring is 50 percent and thus the phase corrector 20 of this invention is of course required. From the foregoing it can be seen that edits can be made in video tape-recording systems without the uncertainty of color subcarrier phase and the problems associated with either repeating the edit or accepting the subcarrier jump.

Color phase corrector 20 is particularly suitable for tape-recording machines used extensively for editing. It may be fitted only to the machine used for recording or it may also be attached to the replay machines as well. If the phase corrector 20 is attached only to the machine used for recording, good edits can be produced. Consider a recording machine about to perform an edit. The machine when fitted with the phase corrector 20 will run up in a "play" mode and lock to the color video reference signal as described hereinbefore. The new subcarrier to be edited onto the tape of the recording machine should always be in phase with the color video reference signal, as the new subcarrier will come from a camera, generator, or from another tape machine fitted with a color subcarrier correcting device corresponding to corrector 14 of FIG. 1. It is therefore essential that the record machine lock onto the color video reference signal so as to produce a subcarrier from the record tape which is continuous. The edit may then be made at any frame on the record tape and at any frame on the new material. When the new material is to be edited from tape, the color subcarrier of its associated machine (replay tape machine) will have to correct its subcarrier by 180° if it locks up to the wrong reference frame as described hereinbefore with respect to FIGS. 2A and 2B. In doing this, it will shift the sync from the replay machine by one-half of the subcarrier period, as described hereinbefore. This shift of the sync can be corrected by passing the composite color signal through a sync stripping and adding amplifier to reinsert reference sync at the correct time. The circuitry disclosed in U.S. Pat. Ser. No. 673,678 filed Oct. 9, 1967 by John D. Ross can be used for this purpose, keeping in mind that the circuitry will process the sync signal rather than the color burst signal as is disclosed in this application. The result of reinserting the reference sync is that a small picture displacement will be observed. This displacement may not be significant unless the new material to be edited onto the tape is in some way related to the old, such as when a transition edit is performed. This problem can be solved by fitting all machines, both the record machines and all playback machines, with the phase corrector 20. If this is done, all tape machines will lock to the color video reference signal correctly.

Thus, in summary, the phase comparator 20 senses whether the tape machine 10 has locked correctly to the horizontal synchronizing pulses by comparing its horizontal synchronizing pulses with the locally generated station reference signal by detecting the half subcarrier period error in the horizontal synchronizing pulse of the composite color signal. If this error is present, the phase comparator 20 will cause vertical synchronizing pulses to the tape machine slightly faster than the reference pulses until the entire signal has been shifted by one frame. The machine is allowed to relock. As the output of the tape machine 10 is not timed correctly with the editing equipment (not shown) on, the machine runs up with it off, and then the phase comparator 20 turns it on via an output signal on line 25 when it has sensed the locked condition.

The invention is also applicable to the PAL color system where because of a more complex relationship between the frame rate and the subcarrier frequency, a two frame shift is required rather than a one frame shift. This can be accomplished by merely inhibiting the first "stop" command from sync comparator 25 so that a second frame shift occurs. The second "stop" command is then permitted to halt the operation of frame shifter 24.

Numerous modifications of the invention will become apparent to one of ordinary skill in the art upon reading the foregoing disclosure. During such a reading it will be evident that this invention provides a unique color phase corrector for use with a video tape machine for accomplishing the objects and advantages herein stated.

What I claim is:

1. Color-phase-correcting circuitry for use with a tape machine including a tape, tape drive, servo means for controlling the speed of said tape in accordance with a control signal applied thereto, a read head for reading a composite color signal stored on said tape in response to relative movement between said tape and said read head, first sync comparator means for developing said control signal for said servo means whenever the horizontal and vertical synchronizing pulses of the said composite signal are not in phase with the horizontal and vertical pulses of a color reference signal and color-phase-adjusting means for adjusting the phase of said composite color signal so as to maintain the phase of the color subcarrier of the color reference signal whereby the phase adjustment made by said first phase adjusting means can be destroyed if a 180° phase difference existed between the color subcarriers of the composite color signal and the color reference signal at the time the phase adjustment was made by said first phase adjustment means, said color-phase-correcting circuitry comprising:

second sync comparator means responsive to the output signal from said color-phase-adjusting means for comparing the phase of at least some of the synchronizing pulses of said composite color signal with the phase of at least some of the synchronizing pulses of said color reference signal and for providing an output signal whenever a deviation exists therebetween; and frame-shifting means responsive to the output signal from said sync comparator means for shifting the color reference signal one frame to thereby shift the composite color signal so that its synchronizing pulses and the color subcarrier are in phase synchronism with the synchronizing pulses and the color subcarrier of said color reference signal if the said 180° phase difference existed.

2. Circuitry as in claim 1 where frame-shifting means increases the repetition frequency of said vertical synchronizing pulses and where said means for controlling the speed of said tape controls the speed in accordance with the repetition frequency of the said vertical synchronizing pulses.

3. Circuitry as in claim 2 where said frame-shifting means increases the frequency of said vertical synchronizing pulses by subtracting line pulses from the said color reference signal.

4. Circuitry as in claim 3 where said frame shifting means causes said tape to be shifted one frame if, after the horizontal synchronizing pulses of the composite color signal and the color reference signal are initially phase synchronized by said first sync comparator means, said second sync comparator means detects a phase deviation between the respective synchronizing pulses of the composite color signal and the color reference signal.

5. Color-phase-correcting circuitry for use with a tape machine including a tape, tape drive, servo means for controlling the speed of said tape in accordance with the repetition rate of the vertical synchronizing pulses of a reference signal applied thereto, a read head for reading a composite color signal stored on said tape in response to relative movement between said tape and said read head, first sync comparator means for developing said control signal for said servo means whenever the horizontal and vertical synchronizing pulses of the said composite signal are not in phase with the horizontal and vertical pulses of a color reference signal and color-phase-adjusting means for adjusting the phase of said composite color video signal so as to maintain the phase of the color subcarrier of the color reference signal whereby the phase adjustment made by said first phase-adjusting means can be destroyed if a 180° phase difference existed between the color subcarriers of the composite color signal and the color reference at the time the phase adjustment was made by said first phase adjustment means, said color phase-correcting circuitry comprising:

second sync comparator means responsive to the output signal from said color phase adjustment means for comparing the phase of the horizontal synchronizing pulses of said composite color video signal with the phase of the horizontal synchronizing pulses of said reference signal and for providing an output signal whenever a deviation exists therebetween; and means responsive to the output signal from said sync comparator means and to the vertical synchronizing pulses of said video reference signal for increasing the repetition rate of the vertical synchronizing pulses applied to said first comparator means;

whereby, if said 180° phase difference existed, said tape has the speed thereof adjusted until the synchronizing pulses and the color subcarrier of said composite color video signal are respectively in phase synchronism with the synchronizing pulses and the color subcarrier of said video reference signal.